Dec. 26, 1922.
D. RIABOUCHINSKI.
ROCKET.
FILED SEPT. 21, 1922
1,440,175
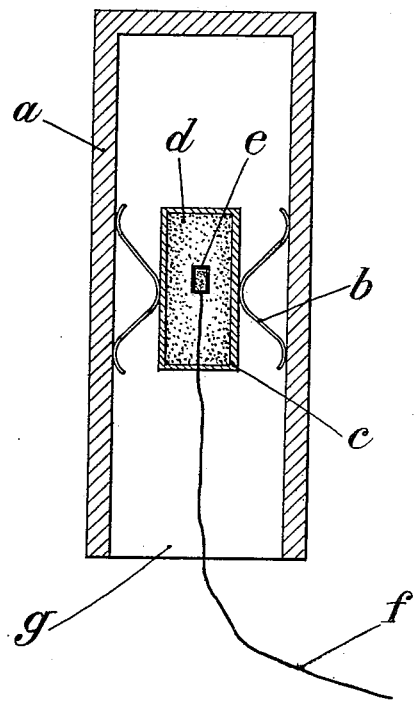
Inventor:
D. Riabouchinski
By
Langner, Parry, Card + Langner
Attys Patented Dec. 26, 1922.

1,440,175

UNITED STATES PATENT OFFICE.

DMITRI RIABOUCHINSKI, OF GUETHARY, FRANCE.

ROCKET.

Application filed September 21, 1922. Serial No. 589,648.

*To all whom it may concern:*

Be it known that I, DMITRI RIABOUCHINSKI, citizen of Russia, residing at Guethary, Basses Pyrenees, in the Republic of France, have invented new and useful Improvements in Rockets, of which the following is a specification.

The present invention has for its object a rocket which is characterized in that it comprises an outer envelope of suitable resistance and an explosive cartridge provided with a detonator, said cartridge being supported within the envelope and smaller than the capacity of the latter. The cartridge forms the only charge of the rocket and causes by exploding in an instantaneous manner, the powerful and abrupt propulsion of said rocket.

In the known rockets, the strongly compressed powder entirely fills the envelope of the rocket with the exception of a conical cavity formed along the axis of the rocket. The combustion of the powder takes place gradually and provides for the propulsion of the rocket in the air.

With the rocket according to the invention, the explosive substance of the cartridge mounted in the envelope of the rocket does not fill said envelope and explodes instantaneously. The gases produced have a high pressure and a high temperature; they fill the envelope and then flow to the outside through the orifice in said envelope, which provides for the propulsion of the rocket.

The envelope of the rocket should have a suitable resistance to undergo without yielding, the shocks and pressures set up within the same.

The advantages of the improved rocket which is a rocket with preliminary combustion consists in that they use less explosive material, they are more easily made, are unaffected by dampness and are very readily handled. They can also be used over again, for in order to load them it is simply necessary to place a fresh cartridge in the envelope.

This rocket can be used in all cases where it is necessary to have an impulse of great intensity and short duration, for instance for the starting of aeroplane engines. This rocket can also be used as a power hammer.

It can also be used under water if the orifice of its envelope is closed by a watertight cover of cork or other material in order to prevent the water going inside the envelope before the explosion.

The accompanying drawing shows diagrammatically and by way of example a form of construction of the rocket according to the invention.

As shown in the drawing, within the envelope $a$ of the rocket, one secures in any manner, for example by means of springs $b$, a cartridge $c$ containing the explosive substance $d$, and a detonator $e$ for instance of the electric type, $f$ being the ignition cable. The cartridge $c$ which is of metal or other material is preferably hermetically closed, and the thickness of its walls depends upon the explosive substance it contains.

The operation is as follows: When the detonater $e$ is fired the latter causes the abrupt explosion of the whole charge $d$ contained in the cartridge $c$. The gases produced will fill the envelope $a$ of the rocket, which is strong enough to resist the pressure. They escape through the orifice $g$ of the rocket and thus effect the propulsion of the latter. By more or less throttling the orifice $g$, it is possible to slow up the flow of gas and thus have a less abrupt propulsion of the rocket.

Obviously, the envelope $a$ of the rocket may have any desired form. If it is desired to obtain a rectilinear impulse, one will preferably adopt a cylindrical shape; if one desires to obtain a torque or rotating impulse (for example for the starting of aeroplane engines), one may adopt an S-shape, and in the latter case, the envelope is open at both ends, the cartridge being placed at the central part of the rocket.

Having now described my invention, what I claim as new and desire to secure by Letters Patent is:

1. A rocket comprising in combination a rocket envelope, an explosive cartridge mounted in said envelope and leaving a free space in the envelope, means for supporting the cartridge within the envelope, the cartridge comprising a case, an explosive charge in said case and a detonator within the charge, and means for firing said detonator, the envelope being sufficiently strong to resist the inner pressure set up by the explosion of the cartridge.

2. A rocket comprising in combination a rocket envelope, an explosive cartridge mounted in said envelope and leaving a free space in the envelope, clamping springs for supporting the cartridge within the envelope, the cartridge comprising a case, an explosive charge in said case and a detonator within the charge, and means for firing said detonator, the envelope being sufficiently strong to resist the inner pressure set up by the explosion of the cartridge.

3. A rocket comprising in combination a rocket envelope of S-shape, an explosive cartridge mounted in the central part of said envelope and leaving a free space in the envelope, means for supporting the cartridge within the envelope, the cartridge comprising a case, an explosive charge in said case and a detonator within the charge, and means for firing said detonator, the envelope being sufficiently strong to resist the inner pressure set up by the explosion of the cartridge.

4. A rocket comprising in combination a rocket envelope having an orifice, an explosive cartridge mounted in said envelope and leaving a free space in the envelope, means for supporting the cartridge within the envelope, the cartridge comprising a case, an explosive charge in said case and a detonator within the charge, and means for firing said detonator, the envelope being sufficiently strong to resist the inner pressure set up by the explosion of the cartridge, and means for affording a watertight closure for the orifice of the rocket envelope.

In testimony whereof I have signed my name to this specification.

DMITRI RIABOUCHINSKI.